United States Patent Office 3,758,391
Patented Sept. 11, 1973

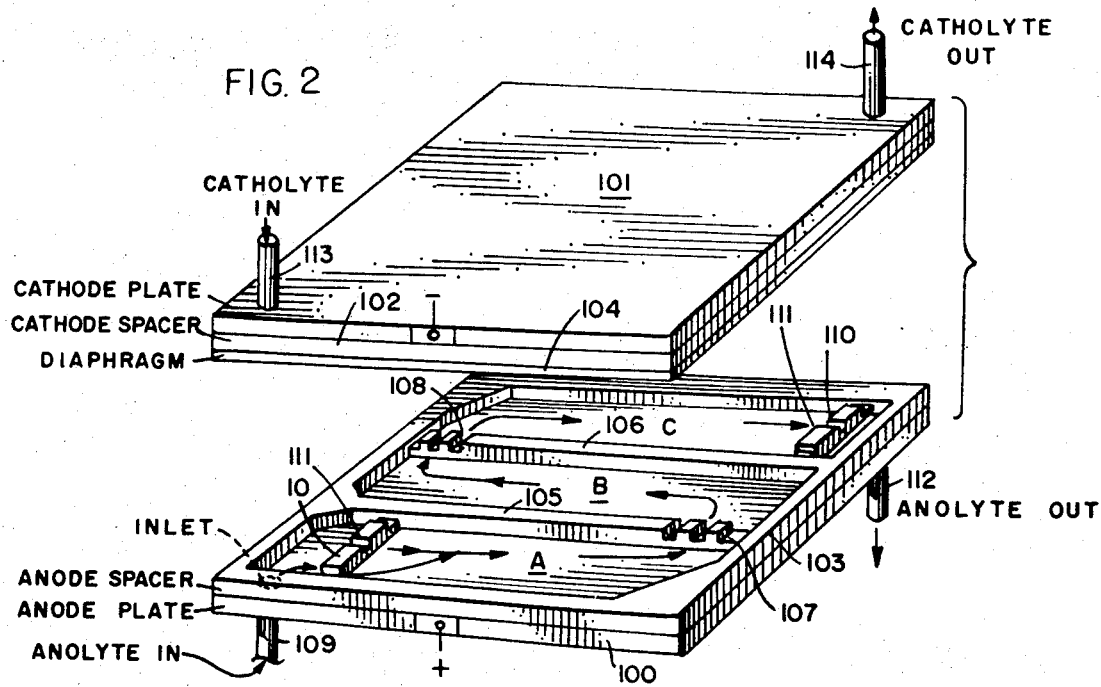
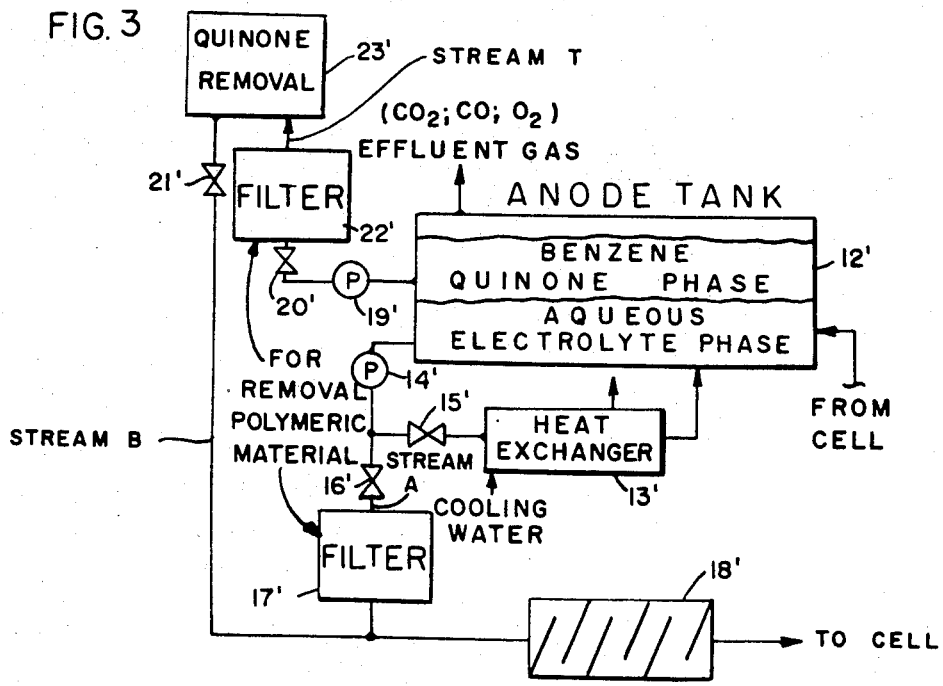

3,758,391
CONTINUOUS RECYCLE PROCESS FOR ELECTROLYTIC CONVERSION OF BENZENE TO QUINONE
Fred J. Anderson, La Salle, and Jack L. Kessler, Ottawa, Ill., assignors to Carus Corporation, La Salle, Ill.
Continuation-in-part of application Ser. No. 139,651, May 3, 1971. This application Dec. 1, 1971, Ser. No. 203,804
Int. Cl. B01k 1/00; C07b 3/00
U.S. Cl. 204—78
6 Claims

ABSTRACT OF THE DISCLOSURE

Quinone is produced by a continuous recycle process using electrolysis cells for anodic oxidation of benzene to quinone. During the cell operation, a polymeric material is formed which is continuously removed with the liquid components of the anolyte and separated therefrom before the anolyte liquid phases are recycled. The cells are employed with diaphragms between the anode and cathode compartments, which may be porous diaphragms or cationic permselective diaphragms. For operation with porous diaphragms, solids are also removed from the catholyte in its recycle circuit. The cells are operated at temperatures above 20° C. and current densities above 5 amps/dm.$^2$ with the production of an anode effluent gas composed predominately of carbon oxidation products.

CROSS-REFERENCE

This application is a continuation-in-part of our copending application Ser. No. 139,651, filed May 3, 1971.

BACKGROUND

Quinone (p-benzoquinone) is a known intermediate for the chemical synthesis of hydroquinone (1,4-dihydroxy benzene). Therefore the economic importance of quinone is based on the fact that hydroquinone is an organic chemical of major commercial importance with an estimated present annual production in the United States of 15 million pounds or more. Hydroquinone is an indispensible major ingredient in photographic developers, serves as an intermediate for many organic chemicals and dyestuffs, and is also used as an antioxidant (viz. in rubber tires), as an anti-skinning addtive in paints, and as a polymerization inhibitor in the handling of monomers. Moreover, it has long been recognized that hydroquinone, with its molecular symmetry and bi-functionality, is an excellent building block in the synthesis of polymers (e.g. polyesters), especially those with high temperature resistance and other desirable properties. Since the Second World War, a large number of patents have issued pertaining to this subject, but, nevertheless, no commerical plastic incorporating hydroquinone has appeared on the market. Although such plastics have highly desirable properties, the price of hydroquinone has remained prohibitively high for such applications. It has therefore been apparent for many years that if the price of hydroquinone could be substantially reduced, the commercial utilization of hydroquinone-based plastics could be expected to develop at a rapid pace.

At present, the most widely used commercial method of making hydroquinone is based on the oxidation of aniline (with $MnO_2$ in sulphuric acid) to quinone with subsequent chemical reduction of the quinone to hydroquinone. The economics of this process are such that significant reductions in prices are unlikely. Economic limitations include high raw material and labor costs. There has therefore been an active search for alternate processes based on lower priced raw materials, and/or involving other savings in production and manufacturing costs.

There is also a potentially large market for quinone itself, if it could be produced at a lower price than at present. Surprisingly, although quinone is an intermediate in the synthesis of hydroquinone (as indicated above), the commercial price of quinone is substantially higher than that of hydroquinone. Because of the nature of the aniline process for producing hydroquinone, it is not economical to isolate the quinone intermediate. Most of the quinone on the market today is manufactured by re-oxidizing hydroquinone, which explains why quinone sells for nearly twice as much per pound as hydroquinone.

Since quinone is one of the most reactive organic chemicals, it is a potentially important starting material for a great many syntheses. Consequently, the search for lower cost processes of producing hydroquinone has also involved consideration of processes whereby the intermediate quinone can be recovered and offered as a commercial product in its own right.

PRIOR ART

For well over fifty years, it has been known that benzene can be electrolytically oxidized to p-benzoquinone. Further, this anodic oxidation of benzene has been extensively studied, both theoretically, and with the hope of practical application. [See, for example, Seyewetz and Miodon, Bul. Soc. Chim. France (4), 33 (1923), 449–456; and Udupa et al., Bul. Acad. Polonaise Sciences, IX, No. 2 (1961) pp. 45–50– and other references cited therein.] The operation of such electrolysis cells involves the evolution of oxygen at the anode and hydrogen at the cathode, which are potentially explosive when mixed. Most prior workers have therefore employed cells with the anode and cathode compartments separated by a diaphragm of porous material, the porosity of the diaphragm permitting ion transfer of electric current between the electrolyte component of the anolyte to the catholyte electrolyte. Batch-type cells were used in most of the reported experiments, but continuous or flow-through type cells have been proposed. (See German patent specifications 1,102,171 and 1,101,436, published March 1961.)

However, the published results have not been encouraging for commercial application. As far as is known, until the present invention, no benzene oxidation process has been developed beyond the laboratory stage. Despite the fact that benzene is a low priced starting material for production of quinone, (for example, as compared to aniline), the art seems to have accepted the view that processes based on the starting material have inherent limitations which preclude practical commercial utilization. In carrying forward and re-evaluating the work of Seyewetz and Miodon (cited above), Udupa et al. reached the discouraging conclusion "that the oxidation proceeds well for short durations of electrolysis only and continuation of electrolysis decreases quinone formations." [Udupa et al., cited above, p. 50 (1961).] Little if any progress is shown by the more recent literature.

U.S. Pat. 2,130,151, issued in 1938, proposes a commercial process based on the use of an open electrolysis cell (without a diaphragm) for the conversion of benzene to quinone at the anode, transfer internally of the quinone to the cathode, and cathodic reduction of quinone to hydroquinone. No commercialization is known. If carried out as described, the mixing within the electrolysis cells of the anodic oxygen with the cathodic hydrogen would appear to create a serious explosion hazard. Further, although not indicated in the patent, it may be assumed that the production of quinone and hydroquinone within an open cell will lead to their reaction, forming insoluble quinhydrone within the cell, which could cause other operational problems. The patent does mention that the anode electrolyte becomes fouled with dissolved oxidation products requiring it to be discarded, and that insoluble matter is formed in the cells requiring shutdowns for cleaning.

German Pat. No. 614,041 also describes an open cell apparatus and process for conversions of benzene to quinone. An inclined anode is suspended above the cathode, and the benzene is introduced beneath the anode plate as a fine droplet dispersion, flowing upwardly along the underside of the plate, and collecting on top of the aqueous phase for recycle. The process and apparatus is claimed to avoid the formation of contaminating solids, but, otherwise, all of the disadvantages described above with reference to U.S. Pat. 2,130,151 would be anticipated. No commercialization is known.

U.S. Pats. 1,322,580 and 2,285,858 described processes for the conversion of benzene to quinone in electrolytic cells equipped with porous diaphragms. Pat. 1,322,580 discloses the use of a current density of 0.5 amperes per square decimeter in conjunction with cell oxidation temperatures below 12° C. No reference is made to the formation of solid contaminants, but it is apparent that the low current density and the amount of cooling required to maintain cell temperatures below 12° C. constitute conditions which are not economically feasible for commercial production of quinone. Pat. 2,285,858 discloses the use of higher temperatures (e.g. 25–30° C.) in conjunction with a current density of 2.4 amps/dm.$^2$. However, it is pointed out that under these conditions the acid electrolyte becomes fouled with oxidation products of benzene which require the electrolyte to be discarded. Neither of these processes is known to have been used commercially.

SUMMARY

The continuous recycle process of the present invention utilizes electrolysis cells with diaphragms separating the anode and cathode compartments. An important advantage of the process is that cell fouling is avoided while utilizing commercially practical conditions of operation. For commercial use, a continuous recycle process should involve as few shutdowns for inspection, cleaning, or replacement of apparatus components as possible. However, during the experimental work leading to the present invention, it was discovered that separation and recycle of the aqueous and benzene phases of the anolyte is interfered with by a by-product contaminant. The exact chemical nature of this by-product contaminant has not yet been determined, but it has the physical characteristic of a polymerical material and is of a slimy, glutinous character. By operating the cells on a flow-through basis with sufficient linear velocity, this polymeric material can be carried out of the cell in the anolyte, or in both the anolyte and catholyte where porous diaphragms are utilized. If the material is allowed to remain in the benzene and/or aqueous recycle streams, the concentration can increase to a point where the material functions as an emulsifier, and physically prevents effective separation of the aqueous and benzene phases. Further, the slimy material tends to trap the anode-produced gas, thereby also interfering with the liquid-gas separation in the anolyte circuit. In accordance with the present invention, therefore, the polymeric material is preferably substantially completely removed from both the recycle aqueous electrolyte and the recycle benzene. By precluding any substantial buildup of a circulating or recycle load of the polymeric material, the oxidizing surfaces of the anodes and the anode compartment surfaces of the diaphragms are protected against fouling.

It is believed that other important advantages are also attributable to the prevention of any substantial recycle of the polymeric by-product. The polymeric material, being subject to further oxidation, would compete for cell energy and could thereby be expected to cause lowered cell efficiency. Further, since the design of the anode compartment of the cell preferably involves relatively small clearances, carrying a circulating load of the polymeric material may require greater pump pressure to achieve the same volume flow rate, and under greater pump pressure, the diaphragms, which may be relatively thin and fragile, are more subject to distortion or breakage.

The cells can be operated with either porous diaphragms, such as diaphragms of filter cloth, or with non-porous diaphragms, such as cationic permeselective diaphragms. Porous diaphragms similar to ordinary filter cloth are considerably less expensive than permselective diaphragms, and may therefore be preferred from the standpoint of material cost. Utilizing the features of the present invention described above, it has been found that plugging of the porous diaphragms can be avoided, and that it is practical to operate with porous diaphragms without any appreciable intermixing of the oxygen-containing anode effluent gas with the hydrogen-containing cathode effluent gas. Employing porous diaphragms in the cells, the operation of the process is further improved by providing for solids removal in the catholyte recycle circuit. In this way, any of the slimy, polymeric material transferring through the porous diaphragm to the cathode compartments, or forming in the cathode compartments, can be continuously removed, and the catholyte, as well as the anolyte, can be kept relatively free of solids in continuous, steady state operation.

Since the electrolytic oxidation is an exothermic process producing considerable heat, it is desirable to operate the cells at temperatures where the required heat exchange cooling for the anolyte and/or the catholyte is not economically prohibitive. It is therefore important that the process of the present invention permits operating temperatures above 20° C., such as temperatures of 25–40° C. Although such temperatures apparently favor the formation of the polymeric by-products, as contrasted with lower temperatures, the use of the higher temperatures in conjunction with the other features of the process make it possible to avoid cell fouling, diaphragm plugging, and shutdowns due to the buildup of solid materials in the anolyte or catholyte solutions.

The use of relatively high current densities is also feasible, which permits the cells to be operated at commercially satisfactory production rates in relation to cell equipment cost. More specifically, the cells are advantageously operated at current densities above 5 amps/dm.$^2$, such as current densities of 7 to 15 amps/dm.$^2$. When such current densities are utilized in combination with the preferred operating temperatures, the anode effluent gas is composed predominantly of carbon oxidation products ($CO_2$; $CO$). Although oxygen is formed on the anode plates, the major portion of this oxygen is apparently utilized to oxidize the undesired pyrocatechol. (See Fichter, J. Soc. Chem. Ind., vol. 48, pp. 325–329 Transactions, Nov. 1, 1929.)

By-product contaminants are thereby continuously oxidized to volatile gases in the anolyte, which cooperates with the solid removal of the anolyte circuit in preventing the buildup of by-product contaminants in the recycled anolyte liquid phases. In continuous stable state operation, the oxygen content of the anode effluent gas will usually be below 25% by volume, and can be kept below 10% by volume.

In the following specification, other features of the process of this invention are set out. It should be understood that such features (viz operating conditions, electrolysis cell design, etc.) can advantageously be employed with the principal features of the process of the present invention. On the other hand, it should be understood that the basic features of the present invention can be advantageously utilized with operating conditions and procedures otherwise taught by the prior art.

DRAWING

In the following description, references will be made to the drawing, wherein—

FIG. 2 is an exploded perspective view of an electrolysis cell unit, which can be advantageously used in the continuous recycle process;

FIG. 3 is a partial schematic flow diagram showing a modification of the anolyte recycle circuit;

DETAILED DESCRIPTION

Figure 1:
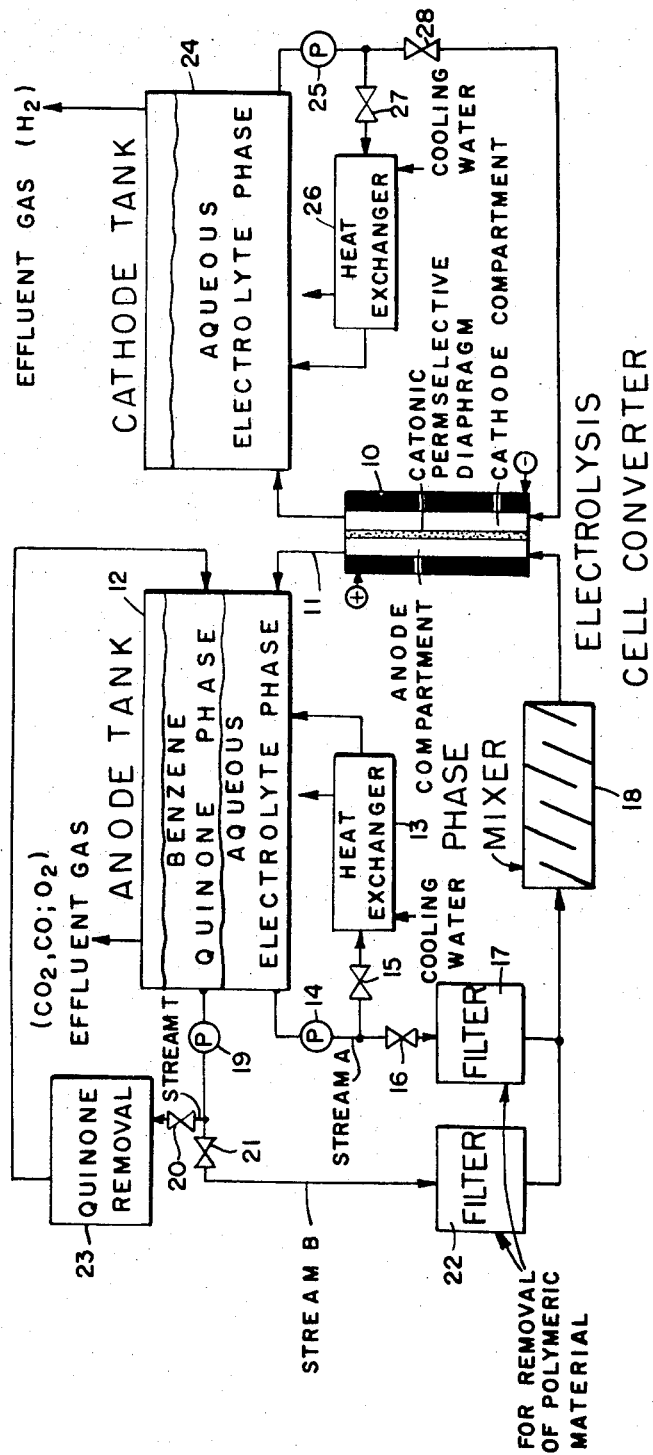
FIG. 1 is a schematic flow diagram illustrating an embodiment of the continuous recycle process of the present invention.

The present invention provides a continuous recycle process for conversion of benzene to quinone by anode oxidation in an electrolysis cell. The method of operation comprises continuously withdrawing from the cell an anolyte mixture contaminated with a polymeric material formed by the oxidation. The anolyte mixture will include a quinone-containing benzene phase, and an aqueous electrolyte phase. The polymeric material is separated from the liquid phases. Portions of the clarified aqueous electrolyte are recycled through the electrolysis cell, and there is mixed therewith portions of benzene substantially free of the polymeric material, and of lower quinone content than that of the withdrawn benzene phase. For continuous operation, at least part of the quinone-containing phase is transferred to a quinone recovery operation, and benzene with the major portion of the quinone removed is returned to the conversion process for admixture with the solids-free electrolyte being supplied to the cell. This may comprise the entire source of benzene for the cell (except for additions of fresh makeup benzene), or a portion of the quinone-containing benzene can be clarified to remove solids, and mixed with the solids free electrolyte together with benzene of reduced quinone content, thereby producing a benzene phase of substantially lower quinone content than the benzene phase removed from the cell.

In practicing the method of the invention, a current-transmitting diaphragm is preferably employed to separate the anode and cathode compartments of the electrolysis cells. This diaphragm can be a permselective cationic exchange membrane or a porous diaphragm.

In practicing the process, the benzene to be subjected to anode oxidation is formed into a dispersion with an aqueous electrolyte, the resulting dispersion comprising the anolyte. A separate aqueous electrolyte, comprising the catholyte, continuously flows through the cathode compartment. For example, both electrolyte phases of the anolyte and the catholyte may be an aqueous acid electrolyte, and both may comprise the same acid electrolyte. From the anode compartments of the cell means, which may comprise a plurality of pairs of anode and cathode compartments arranged for parallel or series flow, there is continuously removed a four-phase mixture comprising a quinone-containing benzene phase, an aqueous electrolyte phase, a gaseous phase, and a solids phase. The gaseous phase will usually comprise a mixture of carbon dioxide and oxygen with some carbon monoxide. The solids phase is a polymeric, slimy by-product formed by the reaction. The phases are separated from each other after removal, and portions of the quinone-containing phase, with added benzene of lesser quinone content, and the aqueous acid electrolyte phase, all substantially free of gas and insolubles can be mixed to form a dispersion of recycle anolyte.

The diaphragms separating the cells into separate anode and cathode compartments can consist of non-porous cation exchange membranes. Where the electrolyte component of the anolyte is an aqueous acid, as preferred, the ion exchange membrane should be capable of transmitting hydrogen ions (H+). Where the catholyte contains quinone for reduction at the cathodes to hydroquinone, non-porous diaphragms are desirable. As previously described, however, the catholyte can consist of an aqueous electrolyte substantially free of quinone.

Porous diaphragms can also be employed because of the features of the process which minimize the circulating load of solid contaminants. Woven filter cloths are suitable, but other kinds of porous diaphragms can also be used.

Referring now to the accompanying flow diagram designated as FIG. 1, there is shown a simplified cross-section of one cell of an electrolysis cell converter 10, which will usually include multiple cells arranged for parallel flow but in series electrically, as bipolar multiple cells of a battery. The cells can be built up sandwich fashion with each plate (except for the end plate) having an anode compartment on one side and a cathode compartment on the other, using a bipolar electrical hookup. As shown for one cell, the anode and cathode compartments are separated in sealed-apart relation by a permselective diaphragm therebetween. However, if porous diaphragms are used, such diaphragms in sheet or plate form, can be positioned in the same way. For example, glass fiber filtration mats can be employed as porous diaphragms.

Returning to the description of FIG. 1, the anode compartment of cell 10 is shown discharging into a pipeline 11 connected to an elongated tank 12. Tank 12 serves as a storage tank for the liquid phases, and also as a gas-liquid and liquid-liquid separator. The gas phase, which will usually be primarily a mixture of carbon dioxide, carbon monoxide, and oxygen, collects at the top of the tank from which it can be removed as an effluent. If desired, the effluent gas can be passed through a condenser or liquid trap to remove vaporized or entrained benzene. In tank 12, the liquid phases are allowed to separate by settling, so that the benzene phase containing the dissolved quinone collects above the higher specific gravity aqueous electrolyte, such as dilute aqueous sulphuric acid.

In the embodiment shown, the polymeric and any other insolubles produced within the anode compartments of the cell are transferred with the liquid and gas phases to the tank 12. The solids tend to follow the benzene phase, but will also be present in the aqueous phase. Both the quinone-containing benzene phase, as separated in tank 12, and the aqueous phase will therefore be contaminated with the slimy insolubles. Some of this material may collect at the interface between the benzene and aqueous phases. If desired, the coalescence of the polymeric solids and their collection at the interface can be promoted by adding surface active agents to make the insolubles less readily wet by the benzene, or to promote separation from the aqueous phase.

Figure 5:
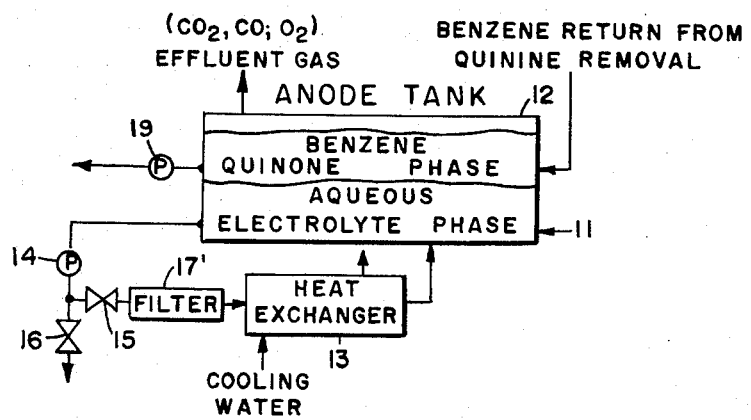
FIG. 5 is a partial schematic flow diagram showing a modification of the anolyte recycle circuit.

Portions of the acid electrolyte phase, which collects in the lower portion of tank 12 can be continuously cycled through a heat exchanger 13 by means of pump 14 for temperature control by cooling, the amount being controlled by valve 15. Pump 14 also passes portions of the aqueous phase, composing Stream A, through filter 17 to phase mixer 18. Filter 17 removes the polymeric materials and any other solids, so that Stream A, as supplied to mixer 18 is substantially free of solids. The filter can be alternatively located in the cooling circuit for the aqueous electrolyte phase, as shown in FIG. 5. Make-up water (not shown) can be added to Stream A, as required to balance the water broken down in converter 10.

The benzene phase, containing the dissolved quinone, is withdrawn from tank 12 at an elevation above the benzene-water interface by means of pump 19. Unless the slimy solid material has been substantially completely removed from the benzene phase by settling or by some other procedure associated with tanks 12, any portions of the benzene-containing phase returned directly to converter 10 are passed through a filter 22. Other portions of the quinone loaded benzene from tank 12 can be passed by pump 19 to a quinone removal operation, as indicated generally at 23. The relative proportions of Stream B, the direct recycle stream, and Stream T, the stream transferred to quinone removal, are controlled by valves 20 and 21. Stream B is filtered at 22 to remove any polymeric material or other solids so that the benzene phase returned to converter 10 is substantially solids free. Stream T may also be filtered as it is transferred to the quinone recovery plant, or a solids separation may be included in that operation. The benzene Stream T after removal of most of the quinone therein is returned to tank 12, wherein it combines with the incoming loaded benzene from converter 10 and results in a dilution, the benzene phase mixture containing less quinone than the benzene phase from converter 10. As shown, the benzene phase (Stream B) and the aqueous electrolyte phase (Stream A) under pump pressure combine in the feed end of the phase mixer and disperser 18, and after becoming intimately mixed and dispersed therein, the resulting recycle anolyte is passed to the anode compartment (or compartments) of converter 10. For the system shown, the phase ratio of the anolyte can be expressed as the volume of Stream A divided by the volume of Stream B, while the transfer ratio is the volume of Stream T divided by the volume of Stream B. It will be understood that suitable control valves, flow meters, and control equipment will be provided to permit the phase ratio and the transfer ratio to be selectively varied and maintained at predetermined values.

Stream T through valve 20 transfers the withdrawn benzene phase to a quinone removal operation for separation of the quinone, and recovery of the benzene for further use in the electrolysis process. Since the specific recovery procedure is not part of the present invention, it is illustrated only generally in the flowsheet of FIG. 1. Depending on the quinone removal process, the returned benzene may still contain some quinone, but the amount will be substantially less than that of the benzene phase from converter 10. For example, the benzene can be distilled off (leaving the solid quinone), condensed, and recycled free of quinone. Fresh or make-up benzene, not previously used in the process can be added to Stream B as required.

The aqueous electrolyte, comprising the catholyte, from the anode compartments of the converter 10 is transferred to an elongated tank 24, which serves as a storage tank and a liquid-gas separator. As shown, the electrolyte (viz dilute aqueous sulphuric acid) separates from the gaseous products of the cathode electrolysis, which principally comprises hydrogen gas. The hydrogen can be removed from the top of tank 24 as an effluent gas. The aqueous electrolyte is withdrawn from the lower portion of tank 24 by means of a pump 25 for continuous circulation through a heat exchanger 26 for cooling the catholyte as required. Pump 25 also supplies the catholyte to converter 10, the flow in the cooling and cell circular being respectively controlled by valves 27 and 28. Make-up electrolyte solution can be added when required to tank 24 or elsewhere in the circuit.

In FIG. 2, there is shown, somewhat diagrammatically, a suitable individual cell for use in practicing the method of this invention. The single cell sandwich shown for purposes of illustration, includes anode and cathode plates 100, 101. Between anode plate 100 and cathode plate 101, there are provided cathode spacers 102 and 103. The spacers 102, 103, respectively, provide cathode and anode compartments, which are separated by diaphragm 104. Preferably, as shown, the anode compartment is in the form of a winding or tortuous passage. For example, spacer 103 can provide compartment dividers 105 and 106, which divide the anode into a series of connected spaces or channels, one end of divider 105 being provided with cross-flow passages 107, and the other end of the divider 106 correspondingly provided with cross-flow passages 108. The anolyte then can be introduced through an inlet pipe 109 upstream of a baffle 110 having flow cutouts 111, and will flow through the first compartment section A, crossing to the second compartment section B through cross-flow passages 107 and then, after traversing compartment section B, will pass to compartment section C through cross-flow passages 108. After traversing compartment C, the anolyte flows through the cutouts 110' of a baffle 111' into an outlet pipe 112. It will be understood that the benzene-electrolyte dispersion will be continuously in contact with adjacent active surfaces of the anode 100, thereby effecting the anode oxidation of the benzene to quinone.

For simplicity of manufacture and to provide maximum support for the diaphragm 104, the cathode spacer 102 can be formed in the same way as the anode spacer 103, that is, with dividers, cross-flow passages, and baffles, respectively, immediately downstream of and upstream of the inlets and outlets. As shown, the catholyte can enter through an inlet pipe 113 and exit through an outlet pipe 114.

In FIG. 3, there is shown a modification of the anolyte recycle circuit of FIG. 1. For convenience of reference, the same components of the circuit have been the same numbers except that the numbers have been primed. The aqueous electrolyte phase in tank 12' circuates in the same way as in the embodiment of FIG. 1. The variation is in the circulation of the quinone-containing benzene phase, which is removed from tank 12' by a pump 19' and passed through a filter 22' for removal of solids. All of the clarified benzene phase is transferred to the quinone removal plant at 23'. After removal of at least the major portion of the quinone, the benzene of substantially reduced quinone content is transferred by means of a pump (not shown) through valve 21' to mixer 18'. As shown, the returned benzene, comprising Stream B merges with the recycled aqueous phase, comprising Stream A in the feed line to mixer 18'. The phase ratio of the anolyte will therefore be the volume of Stream A divided by the volume of stream B. The transfer ratio is 100%, Stream T comprising all of the benzene phase from the converter. This arrangement has the advantage of minimizing the recycling of quinone formed in a previous pass through the converter. Where the quinone removal operation involves a precipitation from the benzene, such as by reacting hydroquinone therewith to form precipitated quinhydrone, the concentration of the quinone in the recycled benzene (Stream B) can be kept below 1 gram per liter, whereas the concentration of the quinone in the benzene phase after passage through the converter, will usually be at least double that amount, that is, 2 grams or more quinone per liter of benzene. To obtain this much or greater increase in quinone concentration in a single pass through the converter, the length of the flow passage through the individual cells can be increased, or the individual cells can be arranged for series flow. This may be especially required where the recovery operation removes substantially all of the quinone from the benzene, such as where the benzene is recovered by distillation.

Figure 4:
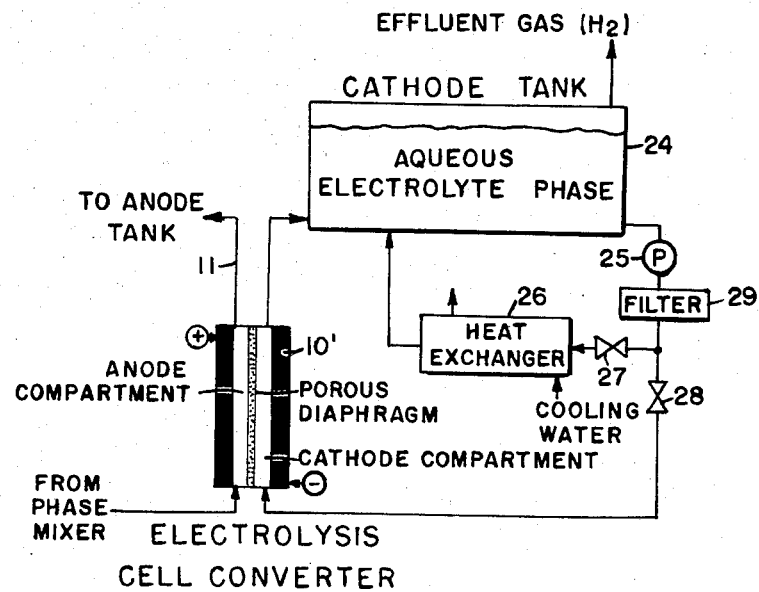
FIG. 4 is a partial schematic flow diagram showing a modification of the cell and the catholyte recycle circuit.

Modifications of the recycled circuits are illustrated in FIGS. 4 and 5. In FIG. 4, the electrolysis cell converter is designated as 10', since the cells are modified to utilize porous diaphragms. With this kind of cell construction, it is prefered to provide for the removal of solids from the aqueous catholyte phase external to the cell converter. For example, as shown, a filter 29 can be interposed in the recycle line downstream of pump 20 and above the line division to valves 27 and 28. Alternatively, filter 29 could be located solely in the cooling circuit through heat exchanger 27, such as between valve 27 and heat exchanger 26; or solely in the anolyte recycle circuit, such as in the line between valve 28 and the electrolysis cell converter 10'. Filter 29 will thereby be effective for the continuous removal of solid by-products formed in the catholyte, or transferred thereto through the porous diaphragms of the cells.

FIG. 5 illustrates a relatively minor modification of the anolyte recycle circuit. To prevent exposure of the heat exchanger to the polymeric solid material, a filter can be located in the heat exchanger cooling circuit upstream of heat exchanger 13. For example, as shown, a filter 17' can be incorporated in the feed line to the heat exchanger between valve 15 and heat exchanger 13. With this arrangement, the filter 17 between valve 16 and phase mixer 18, as shown in FIG. 1 becomes optional, and may be omitted.

In practicing the process of the present invention, the electrolysis cells can be operated at temperatures above 20° C. This means that the recycle anolyte phases, and preferably also the recycle catholyte liquid, is maintained at a temperature above 20° C. by the controlled removal of heat through heat exchangers, such as heat exchanger 13 in the anolyte circuit and/or heat exchanger 26 in the catholyte circuit. Usually, it will be preferable to maintain the temperatures of the anolyte and catholyte within the cells below 45° C. An advantageous operating range for the cells with respect to the liquid phases therein, both anolyte and catholyte, ranges from about 25 to 40° C.

It is also prefered to operate the process with cell current densities above 5 amps/dm.$^2$. For example, current densities of 7 to 20 amps/dm.$^2$ can be used advantageously. The practical upper limit on the current density has not been determined, but it appears that current densities up to 30 or higher amps/dm.$^2$ may be feasible.

In preferred embodiments of the present invention, utilizing the features described above in combination, the anode effluent gas can be controlled so that it is composed mainly of carbon oxidation products ($CO_2$, CO) together with a minor proportion of oxygen. For example, the oxygen content on a gas volume basis can be kept below 25%, and it may be advantageous to maintain it below 10%. This way, additional by-product contaminants are continuously removed from the anolyte, the contaminants being continuously oxidized to carbon dioxide or carbon monoxide.

The anodes and cathodes can be formed from lead sheets or plates. The active surfaces of the anodes will be converted to lead dioxide ($PbO_2$) during the benzene oxidation, and will then provide a stable and active anode. Lead dioxide oxidizing surfaces can also be provided by anodes formed of lead alloys, or conductive anodes coated with lead or lead alloys. Platinum electrodes or other conductive metal or metal alloys can also be used. The cathode is essentially inactive, and the surface in contact with the catholyte will usually not be modified by the electrolysis. Lead, platinum, and other conductive metals and metal alloys can be used.

Using a sandwich cell construction, like that of FIG. 2, the spacers 102, 103 can be formed of a plastic or other material inert under the process conditions. Polypropylene or similar plastic can be used. The diaphragms can be permselective ion exchange membranes permitting the transfer of cations, such as the cation exchange membranes disclosed in U.S. Pat. 3,193,480, in col. 6. (See also U.S. Reissue Pat. 2,865). Suitable cation-transfer membranes are sold by Ionics Incorporated, Watertown, Mass., for example, Ionics Cation Exchange Membrane No. 61AZG067. Alternatively, the diaphragms can be formed of filter cloth, such as filter cloths woven from synthetic resin fibers (viz. polyester fibers).

Other operating conditions can be as follows:

The anode and cathode electrolyte can be aqueous sulfuric acid ($H_2SO_4$) having a concentration of at least 5%, and preferably at least 10% w./w. Concentrations of 10 to 25% w./w. are suitable. Other organic or inorganic acids, such as phosphoric acid ($H_3PO_4$) can be used. Phosphoric acid is a good electrolyte while being somewhat less corrosive for metals than sulfuric acid. In the anolyte, the volume ratio of benzene to aqueous phase can range from 0.01 to 1.0 part benzene phase per part aqueous phase. For continuous operation, the quinone concentration in the anolyte as discharged from the cell can range from 0.5 to 80 grams quinone per liter of benzene. The linear velocity of the benzene-electrolyte dispersion (the anolyte) through the anode compartment should be at least 0.1 and preferably at least 0.3 feet per second. The upper limit of linear velocity is not critical, but a typical operating range is 0.5 to 2 ft./sec.

Cell design specifications include:

| Element: | | Thickness (each) |
| --- | --- | --- |
| Anodes/cathodes | inches | ⅛–¼ |
| Spacers (anode/cathode compartments) | do | ¹⁄₁₆–½ |
| Diaphragms | mils | 20–50 |
| Electrode spacing (anode to cathode) | inches | 0.2–0.8 |
| Anode compartment (preferred size) | do | 0.1–0.3 |

Further information about the process of this invention is shown in the following examples.

EXAMPLE I

A continuous recycle process is operated in accordance with the flow sheet of FIG. 3 (which otherwise is the same as the flow sheet of FIG. 1). The current density is set at 13.5 amps/dm.2, and maintained within the range of 13–14 amps/dm.$^2$. The heat exchangers in the anolyte and catholyte circuits are operated to maintain an anolyte exit temperature from the cell converter of about 30° C. The phase ratio in the anolyte to the converter is 1 part by volume of the benzene phase to 4 parts by volume of the aqueous electrolyte phase. The aqueous electrolyte phase of both the anolyte and catholyte is 10% by weight sulfuric acid, that is, 10 parts by weight of sulfuric acid per 100 parts of the aqueous electrolyte solution. The pump rates in the anolyte circuit are set to give an anolyte flow rate through the converter in terms of linear velocity of 0.6 feet per second. The concentration of quinone in the benzene phase of the anolyte as supplied to the cell is approximately 0.7 gram quinone per liter of benzene. As discharged from the cell, the concentration is approximately 3 grams quinone per liter of benzene. The entire benzene phase as produced by the cell (after separation of the aqueous, gas, and solid phases therefrom) is subjected to a quinone removal operation, wherein the quinone loaded benzene is contacted with hydroquinone to form a quinhydrone precipitate, the precipitate and any excess hydroquinone being separated from the supernatant benzene by filtration. The resulting benzene containing about 0.7 gram quinone per liter of benzene is recycled to the process. As the benzene is used up, fresh or makeup benzene is added to the recycled benzene, and makeup water as required is added to the recycled aqueous electrolyte. The anode effluent gas is composed predominantly of carbon oxidation products with only a minor amount of oxygen. A typical anode effluent gas composition is: 80% $CO_2$, 10% CO, and 10% (or less) $O_2$.

EXAMPLE II

The continuous recycle process is operated as in Example I, except that the cationic perm selective diaphragms are removed from the electrolysis cells, and replaced with porous diaphragms; namely, woven Dynel filter cloth, Style 182–003–000, produced by the National Filter Media Corporation of New Haven, Conn. The catholyte circuit is then operated as illustrated in FIG. 4, a filter, such as filter 29, being incorporated in the recycle line, so that the recycled aqueous electrolyte phase is free from solids.

EXAMPLE III

Following the procedure of either Example I or II, the continuous recycle process is operated using aqueous phosphoric acid as the electrolyte in the anode circuit. The desirable concentration range is 10% to 60% by weight phosphoric acid, with 30% by weight being particularly suitable.

In the foregoing examples, and with reference to the attached flow sheets, the polymeric solids produced in the cell are shown as being removed from the recycle streams by filtration. It will be apparent to those skilled in the art that other methods of solids removal can be utilized, such as centrifugation, decanting, coalescence and settling, etc. From a process standpoint, it is the removal of the polymeric solids from the recycle streams which is important, and not the specific procedure for removal, whether by filtration or by some other technique of solids removal.

What is claimed is:

1. A continuous recycle process for converting benzene to quinone in electrolytic cell means providing within an enclosed zone spaced anodes and cathodes between which a direct current voltage is applied, and including current-transmitting diaphragm means interposed between said anodes and cathodes to provide separate anode and cathode compartments, comprising continuously flowing an anolyte through said anode compartments and a catholyte through said cathode compartments, said anolyte comprising a dispersion of benzene and an aqueous acid electrolyte, said anode effecting oxidation of said benzene to form quinone together with gaseous, soluble, and solid by-products, wherein the improvement comprises in combination: maintaining said anolyte within said cell means at a temperature above 20° C., applying said direct current at a density above 5 amps/dms.$^2$, continuously removing a four-phase mixture from said anode compartments comprising a quinone-containing benzene phase, an aqueous acid electrolyte phase, a gaseous phase, and a slimy solids phase, said gaseous phase being composed mainly of carbon oxidation products together with a minor proportion by volume of oxygen, separating said phases from each other, remixing with benzene portions of said aqueous acid electrolyte phase substantially free of said gaseous and slimy solids by-products, said continuously recycling the resulting mixture through said anode compartment.

2. The process of claim 1 in which said direct current is applied at a density of from 7 to 20 amps/dm.$^2$, said anolyte and catholytes within said cell compartments are maintained at a temperature of from 25 to 40° C., and said gaseous phase is composed of said carbon oxidation products together with less than 25% by volume of oxygen.

3. The process of claim 2 in which said diaphragm means is porous to the passage of liquid therethrough, and in which said catholyte is recycled through said catholyte compartments, while, external to said cell means, said catholyte is subjected to a solids removal step.

4. A continuous recycle process for converting benzene to quinone in electrolytic cell means providing within an enclosed zone spaced anodes and cathodes between which a direct current voltage is applied, and including current-transmitting diaphragm means interposed between said anodes and cathodes to provide separate anode and cathode compartments, comprising continuously flowing an anolyte through said anode compartments, said anolyte comprising a dispersion of benzene and an aqueous acid electrolyte, said anode effecting oxidation of said benzene to form quinone together with gaseous, soluble, and solid by-products, wherein the improvement comprises in combination: maintaining said anolyte within said cell means at a temperature above 20° C., applying said direct current at a density above 5 up to 30 amps/dm.$^2$, continuously removing a four-phase mixture from said anode compartments comprising a quinone-containing benzene phase, an aqueous acid electrolyte phase, a gaseous phase, and a solids phase, said gaseous phase containing less than 25% by volume of oxygen, separating said phases from each other, filtering the separated liquid phases to remove solids therefrom, remixing portions of said aqueous acid electrolyte phase with portions of said benzene phase, and continuously recycling the resulting mixture through said anode compartment.

5. The process of claim 4 in which said direct current is applied at a densty of from 7 to 20 amps/dm.$^2$, said anolyte and catholytes within said cell compartments are maintained at a temperature of from 25 to 40° C., and said gaseous phase is composed predominantly of oxidation products of carbon together with less than 10% by volume of oxygen.

6. The process of claim 5 in which said diaphragm means is porous to the passage of liquid therethrough, and in which said catholyte is recycled through said catholyte compartments, while, external to said cell means, said catholyte is subjected to a solids removal step.

References Cited

UNITED STATES PATENTS 2,285,858   6/1942   Horrobin et al. _____ 204—78

JOHN H. MACK, Primary Examiner

R. L. ANDREWS, Assistant Examiner

PO-1050
(5/69)

UNITED STATES PATENT OFFICE
CERTIFICATE OF CORRECTION

Patent No. 3,758,391           Dated September 11, 1973

Inventor(s) FRED J. ANDERSON and JACK L. KESSLER

It is certified that error appears in the above-identified patent and that said Letters Patent are hereby corrected as shown below:

In Column 11, line 45, please change "said" to --and--.

Signed and sealed this 19th day of February 1974.

(SEAL)
Attest:

EDWARD M. FLETCHER, JR.
Attesting Officer

C. MARSHALL DANN
Commissioner of Patents